D. E. GRIFFITHS.
METALLURGICAL FURNACE.
APPLICATION FILED OCT. 21, 1918. RENEWED FEB. 16, 1920.
1,350,865.
Patented Aug. 24, 1920.
5 SHEETS—SHEET 1.
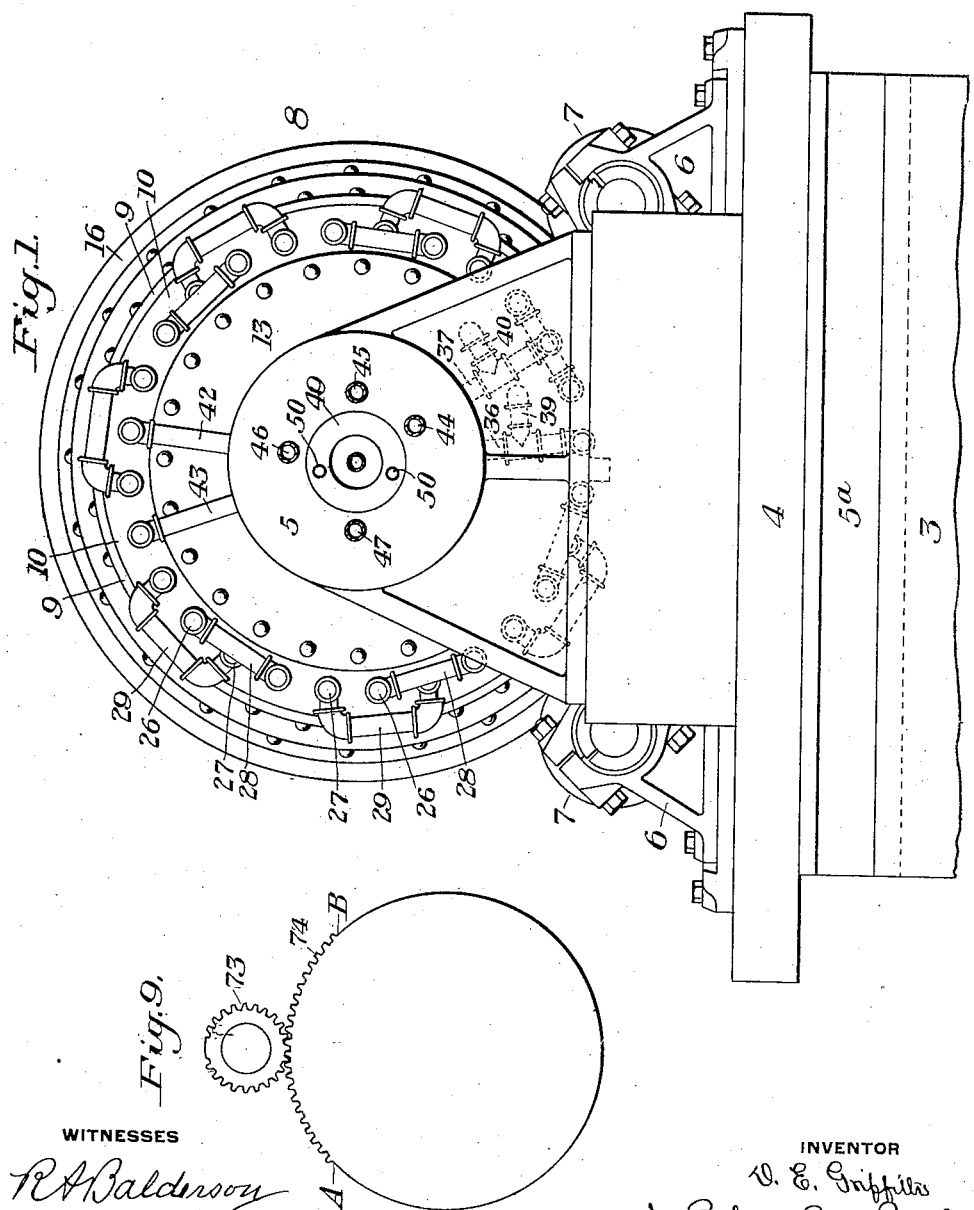
WITNESSES
INVENTOR

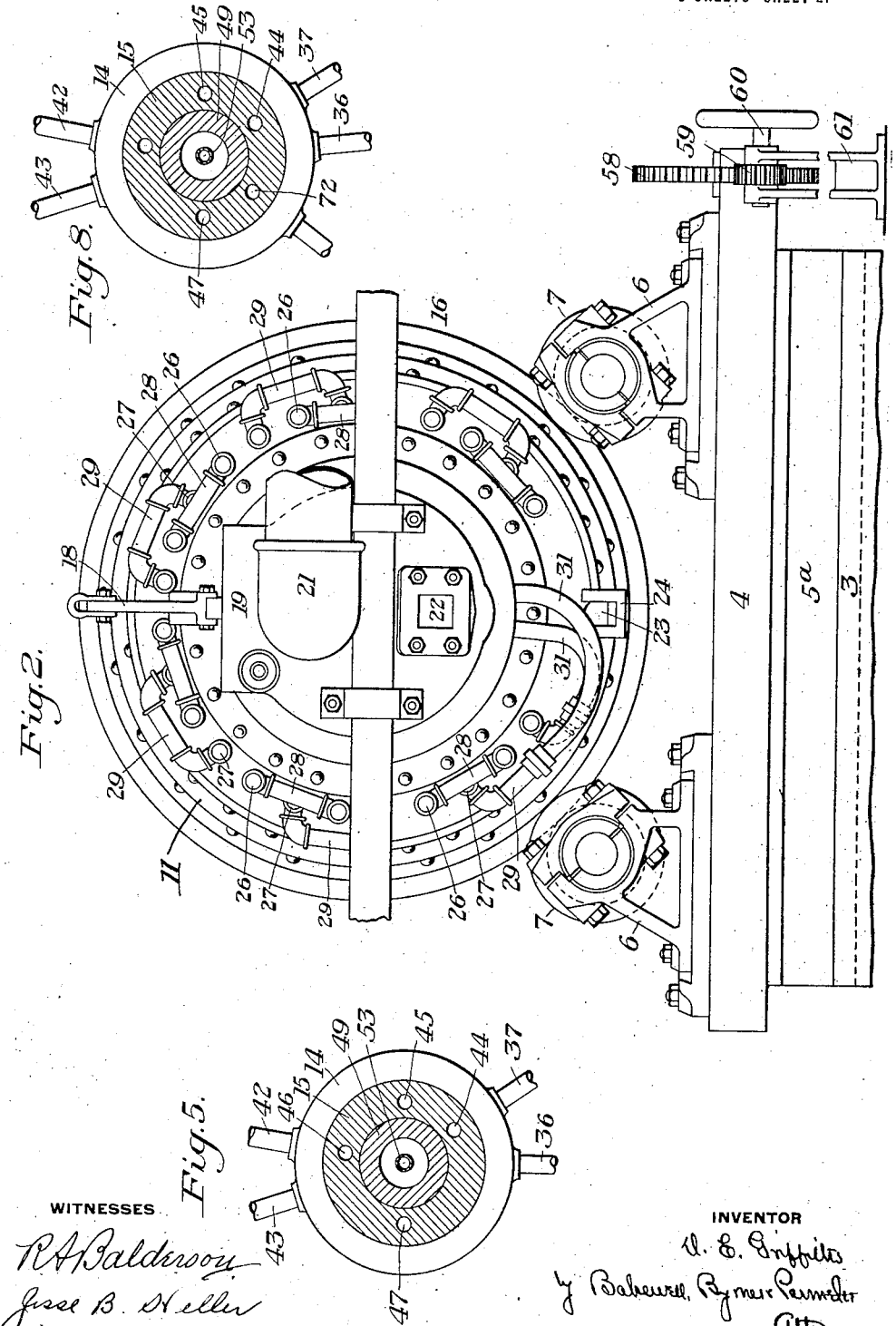

D. E. GRIFFITHS.
METALLURGICAL FURNACE.
APPLICATION FILED OCT. 21, 1918. RENEWED FEB. 16, 1920.
1,350,865.
Patented Aug. 24, 1920.
5 SHEETS—SHEET 3.
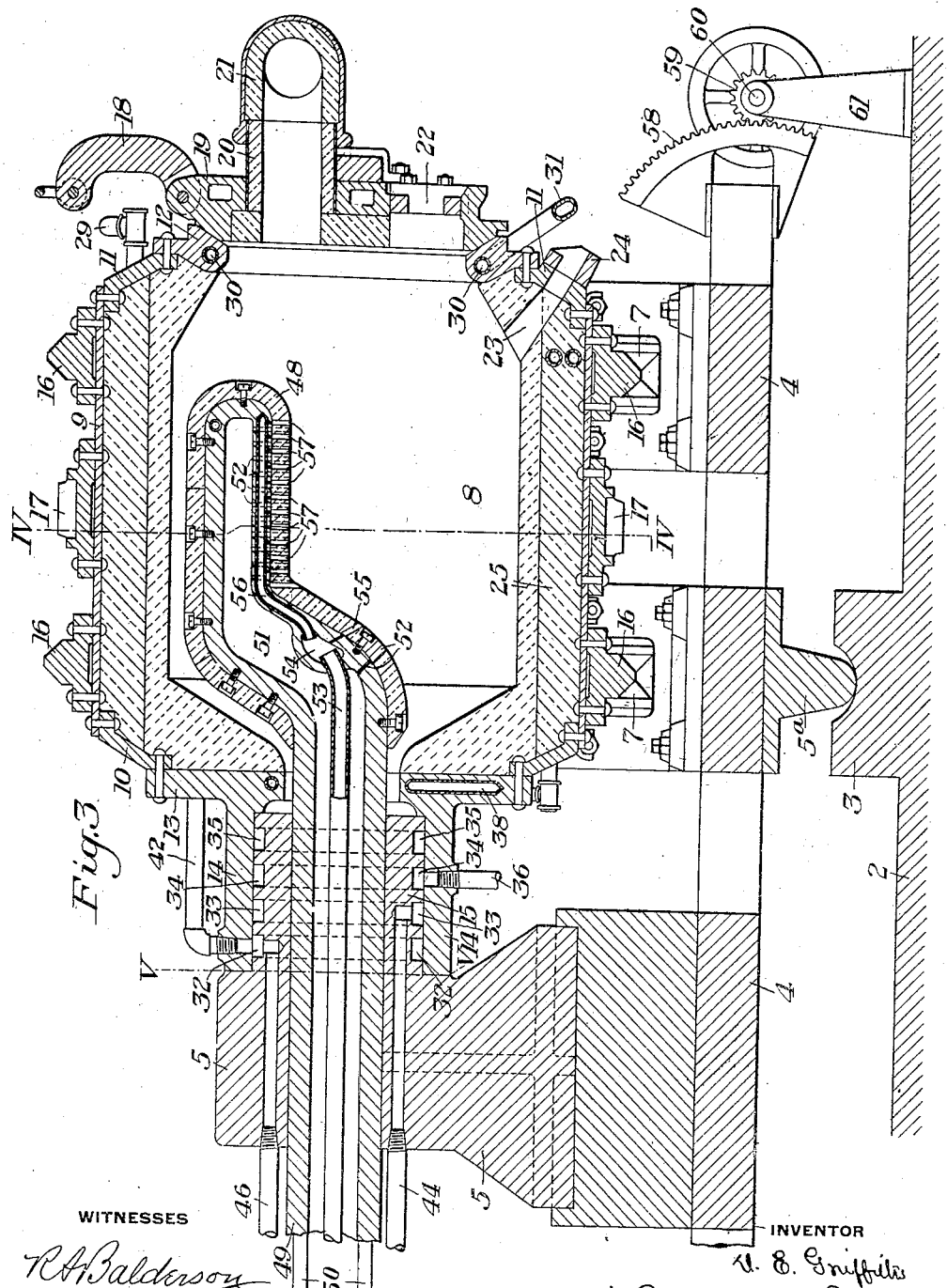

D. E. GRIFFITHS.
METALLURGICAL FURNACE.
APPLICATION FILED OCT. 21, 1918. RENEWED FEB. 16, 1920.
1,350,865.
Patented Aug. 24, 1920.
5 SHEETS—SHEET 4.
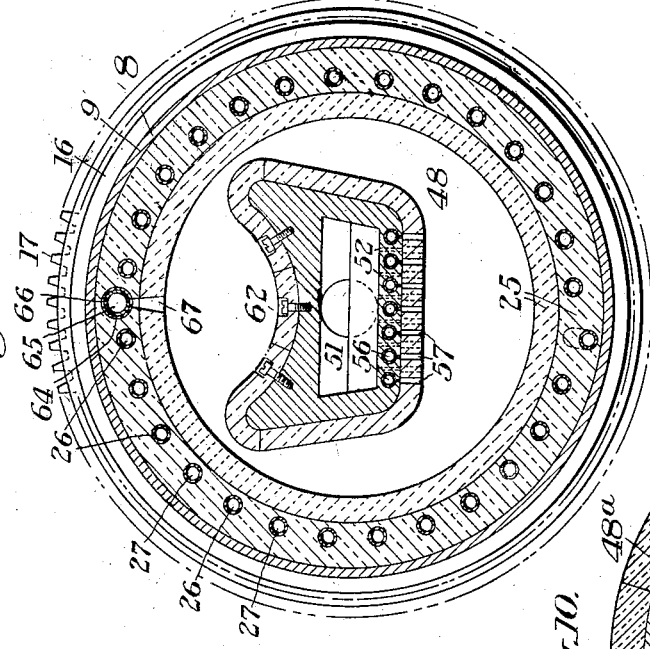
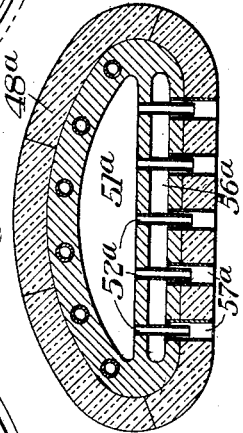
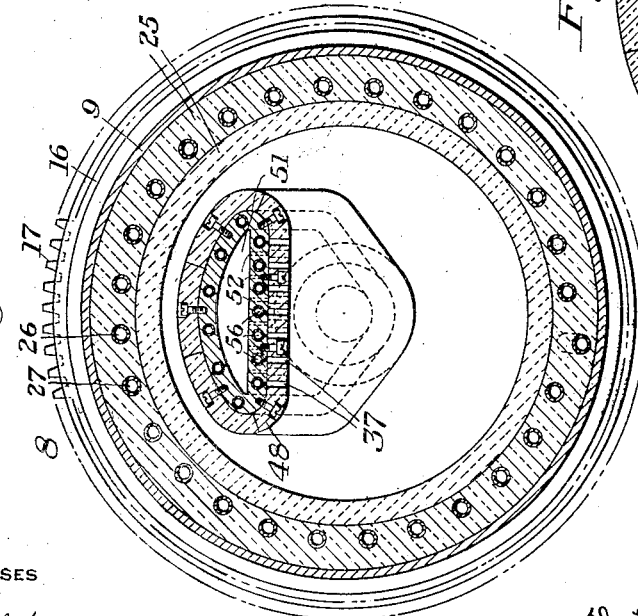

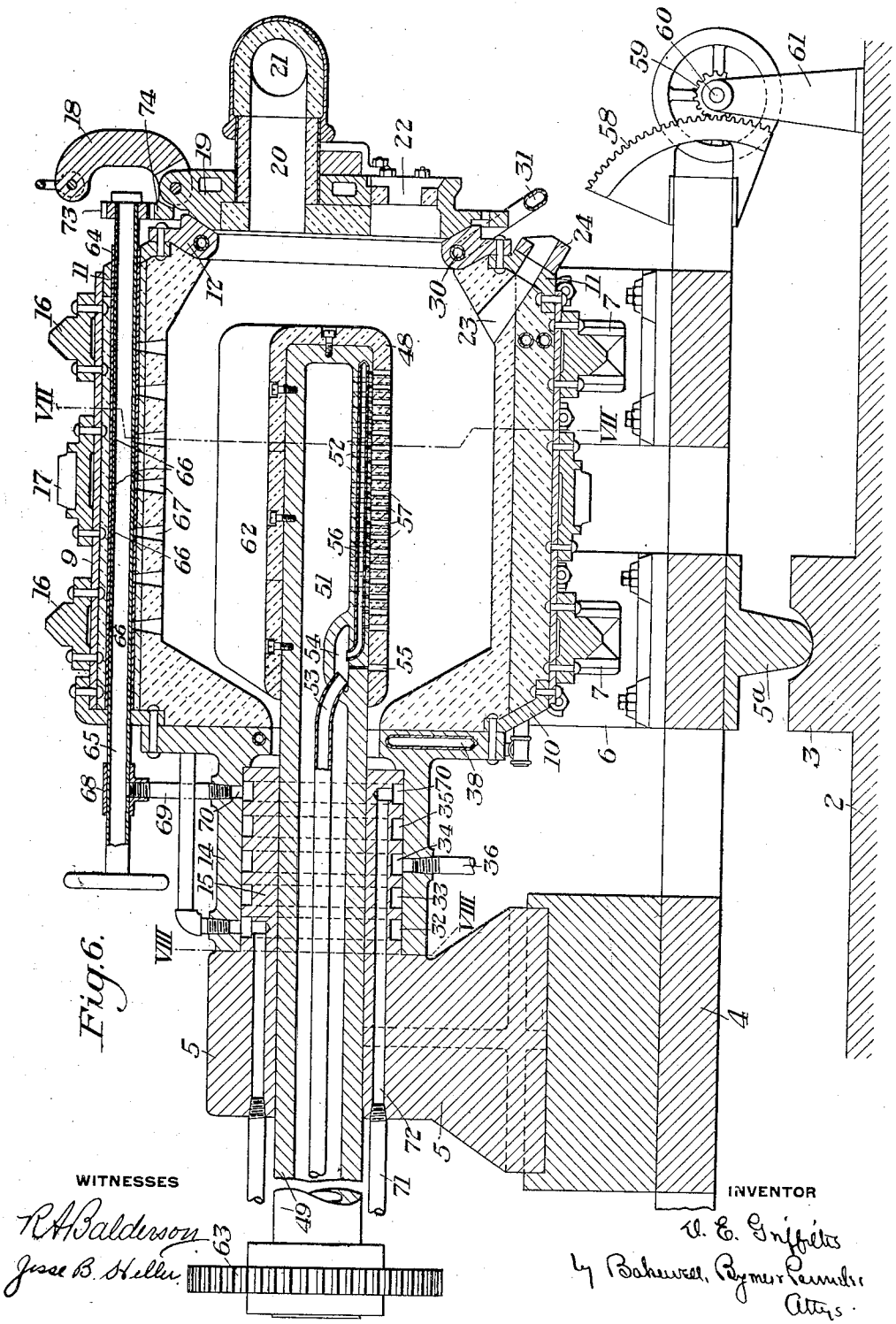

UNITED STATES PATENT OFFICE.

DANIEL E. GRIFFITHS, OF PITTSBURGH, PENNSYLVANIA.

METALLURGICAL FURNACE.

1,350,865.  Specification of Letters Patent.  Patented Aug. 24, 1920.

Application filed October 21, 1918, Serial No. 259,061. Renewed February 16, 1920. Serial No. 359,200.

*To all whom it may concern:*

Be it known that I, DANIEL E. GRIFFITHS, a citizen of the United States, and a resident of Pittsburgh, in the county of Allegheny and State of Pennsylvania, have invented a new and useful Improvement in Metallurgical Furnaces, of which the following is a full, clear, and exact description, reference being had to the accompanying drawings, forming part of this specification, in which—

Figure 1 is an end view of one form of my improved furnace.

Fig. 2 is a similar view from the opposite end thereof.

Fig. 3 is a vertical longitudinal section through the furnace, shown in Figs. 1 and 2.

Fig. 4 is a transverse section on the line IV—IV of Fig. 3.

Fig. 5 is a similar view on the line V—V of Fig. 3.

Fig. 6 is a view similar to Fig. 3 showing another form of furnace.

Fig. 7 is a sectional view on the line VII—VII of Fig. 6.

Fig. 8 is a detail sectional view on the line VIII—VIII of Fig. 6.

Fig. 9 is a detail view showing the gearing for rotating the blast pipe in the furnace shown in Figs. 6 to 8.

Fig. 10 is a sectional view of a modified form of burner.

This invention relates to metallurgical furnaces of the rotary type, which can be used for various purposes.

One of the objects of my invention is to provide a furnace of this character which is simple of construction, readily operated, and which is designed for smelting or refining metal, or for puddling.

Another object of my invention is to provide cooling means for the furnace in which oil may be heated for generating gas for firing the furnace, and also for heating the air which is to be mixed with the gas. A further object of my invention is to provide means for maintaining connections between the cooling jackets and the inlets and outlets therefor when the furnace is rotated or stationary. A still further object of my invention is to provide a gas burner of novel character which is water cooled and which may be maintained stationary or rotated for purposes hereinafter described.

The precise nature of my invention will be best understood by reference to the accompanying drawings, which will now be described, it being premised, however, that various changes may be made in the details of construction and the general arrangement of the parts without departing from the spirit and scope of my invention as defined in the appended claims.

Referring to Figs. 1 to 5 of the drawings, the reference character 2 designates a suitable foundation having a transverse grooved support 3. 4 is a bed plate having a longitudinal projection 5ª seated in the support 3. Mounted on the bed plate 4 is a bearing member 5 at one end of the structure, and 6 are bearings for rollers 7 for supporting a rotary furnace 8. The furnace 8 comprises an outer shell 9 and end flanges 10 and 11 which are secured to the shell in any manner. Connected to the end flange 11 is a head member 12 having an annular opening therethrough, and 13 is a head member secured to the annular flange 10 at the opposite end. This head member 13 is provided with a boss 14, which surrounds a projection 15 on the bearing 5. Mounted on the exterior of the shell 9 of the furnace are annular tracks 16, which engage the rollers 7 and are adapted to support the main body of the furnace, and 17 is annular rack secured to the shell 9 and which is adapted to be engaged by a pinion to rotate the furnace for the purposes hereinafter described.

Pivotally connected to a link 18, which may be supported in any suitable manner, is a closure 19 for the one end of the furnace, which closure has a ground joint with the head member 12 for maintaining a tight joint between the two members when the furnace is rotated. This head member 19 is provided with a bushed opening 20 which is connected with the offtake flue 21 and is also provided with an opening 22 for inspecting the contents of the furnace. 23 is a tapout opening through the walls of the furnace and is provided with a suitable spout 24 which is connected to the annular flange 11.

The furnace 8 is provided with a suitable lining 25, the character of which will be determined by the material to be worked within the furnace, and extending longitudinally through the lining are a plurality of tubes 26 and 27, the tubes 26 being connected in series with each other at each end of the furnace by means of connecting pipes 28, while the tubes 27 are connected to each other at each end in series by connectors 29. 30 is a cooling pipe within the head member 12 which is connected to the ends of the coil formed by the tubes 27 and connectors 29 by means of tubes 31. The projection 15 is provided with a plurality of annular grooves 32, 33, 34 and 35 for conveying the fluid to and from the inlet and outlet pipes for the cooling system connected to the furnace, as hereinafter described. 36 is a pipe which communicates with the groove 34 and is connected to one end of the cooling coil formed by the pipes 27 and connector members 29, the other end of the coil being connected to the pipe 37 which communicates with groove 35. The pipe 36 is connected to the sleeve 14, and in line with the groove 34, while the pipe 37 is similarly connected to said sleeve and in line with the groove 35. Cold water or air is led into the channel 34, as hereinafter described, then passes through the pipe 36 through the one portion of the coil, then through the tube 31 into the tube 30 in the head 12, then out through the other tube 31 and through the remainder of the coil and out through the pipe 37 to the channel 35. 38 is a cooling jacket within the head 13, which is connected directly with the inlet and outlet pipes 36 and 37, respectively, by means of pipes 39 and 40, respectively, as clearly indicated in Fig. 1.

42 is a pipe connected to one end of the coil formed of the tubes 26 and coupling members 28, and the sleeve 14, and communicates with the groove 32; and 43 is a similar pipe connected to the other end of the coil which communicates with the groove 33. Extending through the bearing member 5 are a plurality of openings, and connected to these openings are pipes 44, 45, 46 and 47; each of the openings through the bearing communicates with one of the grooves in the projection 14, the arrangement being such that cold water or air is admitted through the pipe 44, passes through the coils and out through the pipe 45, while oil passes in through the pipe 46 and passes out as gas through the pipe 47.

It will readily be understood by those familiar with the art that the various connections will be maintained irrespective of the position of the furnace or whether the furnace is stationary or rotating.

The coils composed of the tubes 27 and the various connectors 29 may be used for water for cooling the jacket of the furnace, or air may be used for cooling said jackets which is in turn heated and is adapted to be used in connection with gas for heating the products within the furnace. Mounted within the furnace is a burner 48 having a hollow stem 49 which extends outwardly through the one end of the furnace and the bearing 5. Extending through the walls of the burner are cooling pipes 50 through which water is circulated to cool the burner. Within the burner is an air chamber 51 which is connected in any suitable manner to a blower through which the heated air passing from the pipe 45 may be blown, and extending through the walls of the burner within the chamber are a plurality of ports 52 which permit the air to pass from the chamber 51 into the furnace. 53 is a gas inlet pipe which extends in through the air chamber 51 and communicates with the gas chamber 54. 55 are a plurality of gas ports leading from the chamber 54 into the furnace and 56 are a plurality of tubes connected to the gas chamber 54. 57 are gas ports for permitting the gas to flow from the tubes 56 into the furnace and which gas ports are adjacent to the air ports 52. Connected to the end of the base plate 4 is a rack 58, which meshes with a pinion 59 on a shaft 60, which is journaled in suitable bearings 61 on the base of the machine; the mechanism being arranged to cause the furnace to be tilted for the purpose hereinafter described.

After the furnace has been properly heated the closure or door 19 is swung back on a support 18, and the material is charged into the furnace through the open mouth in the head member 12, and after the furnace has been charged the closure is again moved into position to close the opening through the head. If the furnace is used for puddling iron the furnace is operated in a manner similar to the well known type of mechanical puddlers and after the material has been balled, the closure 19 is swung back out of position and the balled material is removed from the furnace and transferred to the squeezer. During the operation of the furnace the cooling medium may be passed through the various coils in order to maintain the outer portion of the furnace at the proper temperature, the connections being such that the flow is not interrupted regardless of whether the furnace is rotated or stationary. If the material which is charged into the furnace is reduced into a molten state, the fluid material can be tapped out through the tap or opening 23.

In Figs. 6 to 9, I have illustrated a structure similar to that shown in the other figures, but in which I have shown a straight burner instead of an up-turned burner. In these figures, I have used the same reference characters to designate similar parts. The furnace shown in these figures is more particularly adapted to making metal direct from the ore, so I have formed a cavity 62 in the top of the burner for the reception of the ore and which is exposed to the heat within the furnace. Connected to the outer end of the hollow stem 49 of this burner is a gear wheel 63 which may be connected to any suitable source of power to rotate the burner for the purposes hereinafter described. Extending longitudinally through the lining 25 of the furnace is a tube 64, and rotatably mounted within this tube is a blast tube 65 having openings 66 which are adapted to register with the twyer openings 67 when the furnace is rotated to bring the twyer openings to the bottom of the furnace, as hereinafter described.

The tube 65 is also rotatably mounted within a coupling member 68, which is connected to a tube 69, which is in turn connected to the head 14 and communicates with a groove 70 in the projection 15. 71 is a tube connected to an orifice 72 which passes through the bearing 5 and communicates with the groove 70 and which tube is connected to a suitable source of air supply. Connected to the opposite end of the tube 65 is a pinion 73, which is provided with a plurality of teeth and a short plain surface, and connected to the closure 19 is an annular flange 74 which is provided with a few teeth on one portion thereof, there being sufficient teeth on this rack to rotate the pinion 73 a complete turn for each turn of the flange 74, the arrangement being such that when the furnace is rotated from the position shown in the drawings to bring the tube to the bottom of the furnace, the tube 65 will be rotated to bring the ports 66 into register with the twyer openings 67, during the time that the teeth of the pinion are in engagement with the teeth on the annular flange, and the tube 65 will be held in this position until after the pinion has passed from the point A to the point B.

Both of the furnaces described in the foregoing specification may be used for puddling iron while the temperature thereof can readily be controlled by means of the burner and the cooling device. If it is desired to have a very high temperature air is used for cooling the walls of the furnace and which air is in turn heated and used in connection with gas generated in the oil coils for heating the furnace, but if it is desired to cool down the furnace, water can be circulated through the one set of coils, the other set being used for generating the gas from the oil.

In Figs. 6 to 9 of the drawings, the furnace is adapted to produce metal direct from the ore, the ore is first placed in the recess 62 and heated therein and is afterward dumped into the furnace by rotating the burner by means of the wheel 63, and in which it is fused and a new charge of ore placed in the cavity 62. After the metal has been properly treated within the furnace, the furnace is rotated to bring the blast pipe 65 to the bottom of the furnace, the rotation of the furnace will register the blast openings with the twyer openings so that the blast will pass through the twyer openings before that portion of the furnace reaches the molten metal, and the blast is maintained on the metal a predetermined time; after which the furnace is again rotated to bring it to the point illustrated in the drawings. The molten metal is then removed through the opening 23.

In Figs. 1 to 6 of the drawings, the furnace is more particularly adapted for puddling and therefore it is not necessary to rotate the burner as no ore is heated on top thereof. The operation of puddling iron in this furnace would be the same as the usual process of puddling in the well known rotary furnaces.

In Figs. 1 to 5, I have shown the burner offset, while in the other figures, I have shown a straight burner, but it will readily be understood by those familiar with the art that the burner containing the recess or cavity for the ore can be offset in a manner similar to the burners shown in Figs. 1 to 6.

In Fig. 10 I have shown a modified form of burner $48^a$, having a gas chamber $56^a$ and an air chamber $51^a$. $57^a$ are air ports extending from the air chamber through the wall of the burner, and $52^a$ are tubes communicating with the gas chamber $51^a$ and which extend into the air ports $57^a$. By this arrangement the air and gas are thoroughly mixed before passing to the furnace.

As before stated, the two sets of coils are adapted to cool the walls of the furnace, and the tubes of the two sets of coils are spaced in alternate relation to each other, as clearly shown in the drawings. It will also be understood that any cooling medium such as water and air can be passed through one set of coils, and if air is used it may be used in connection with the burner, together with the gas. It will also be understood that if desired, gas may be forced through the other coils to be heated and used in the burner, or oil may be passed through this last mentioned coil in order to generate gas to be used in the burner.

The advantages of my invention result from the provision of a relatively fixed burner within a rotary furnace, and also from the provision of a burner from which the products of combustion are directed downwardly directly on to the metal being treated. Further from the provision of a furnace of the rotary type in which the walls of the furnace are provided with cooling coils which are so arranged that connections are always maintained therewith when the furnace is rotated relative to the burner and which are alternately arranged so that different fluids can be passed through said coils to reduce the temperature of the furnace walls, and at the same time heat the fluids which may be used for heating up the furnace; and also from the provision of means for cooling the burner within the furnace. Further, from the provision of means for tilting the furnace during rotation thereof, and at the same time maintaining proper connections with the coils and with the burner; also from means for furnishing a blast of air to the molten metal during the refining process in which the arrangement is such that the blast pipe is maintained above the level of the molten metal when not in use and can be brought into position below the level of the metal when the blast is turned on. Also from the provision of means for automatically turning on the blast when the furnace is rotated to bring the blast pipe below the level of the molten metal and to cut off the blast after the blast pipe has passed beyond the level of the metal.

I claim:

1. A rotary furnace adapted to receive material to be treated having a charging opening at one end, a closure therefor, and a relatively stationary burner within said furnace extending through the other end; substantially as described.

2. A rotary furnace adapted to receive material to be treated having a charging opening at one end, a closure therefor, and a relatively stationary burner within said furnace extending through the other end, together with means for supplying air and gaseous fuel to said burner; substantially as described.

3. A rotary furnace adapted to receive material to be treated having a charging opening at one end, a closure therefor, a relatively stationary burner within said furnace extending through the other end, means for cooling said burner, and means for supplying air and gaseous fuel to said burner; substantially as described.

4. A rotary furnace adapted to receive material to be treated, a support for the furnace at one end thereof, a relatively stationary burner within said furnace, means for cooling said burner, means for cooling the walls of the furnace, rotatable connections between the support and the furnace for the cooling means, and means for supplying air and gaseous fuel to the burner; substantially as described.

5. A rotary furnace adapted to receive material to be treated having a charging opening at one end, a closure therefor, a stationary burner within said furnace extending through the other end, said burner having a hollow stem extending outwardly through one end of the furnace, means for supplying gaseous fuel and air through the hollow stem to the head of the burner, and means for cooling said burner; substantially as described.

6. A rotary furnace adapted to receive the material to be treated, a relatively stationary burner within said furnace, said burner having a hollow stem extending outwardly through one end of the furnace, gas and air chambers within said burner, air openings leading outwardly from the air chambers through the burner head, gas nozzles leading outwardly from the gas chamber through the air chamber into the air openings in the head of the burner, and means for supplying gas and air to the respective chambers through the hollow stem; substantially as described.

7. A rotary furnace adapted to receive the material to be treated, a relatively stationary burner within said furnace, said burner having a hollow stem extending outwardly through one end of the furnace, gas and air chambers within said burner, air openings leading outwardly from the air chamber through the burner head, gas nozzles leading outwardly from the gas chamber through the air chamber into the openings in the head of the burner, means for supplying gas and air to the respective members through the hollow stem, and means for cooling the burner; substantially as described.

8. A rotary furnace adapted to receive the material to be treated, having a head connected to each end thereof, there being an opening through each of said heads, a closure for one of said heads having an offtake flue connected thereto, means for supporting said closure independent of the furnace, a gas burner within said furnace having a hollow stem extending outwardly through an opening in the other head, and means for supplying air and gaseous fuel to said burner through said hollow stem; substantially as described.

9. A rotary furnace adapted to receive the material to be treated, having a head connected to each end thereof, there being an opening through each of said heads, a closure for one of said heads having an offtake flue connected thereto, means for supporting said closure independent of the furnace, a gas burner within said furnace having a hollow stem extending outwardly through an opening in the other head, means for supplying air and gaseous fuel to said burner through said hollow stem, and means for cooling the burner; substantially as described.

10. A rotary furnace arranged to receive the material to be treated, a relatively stationary burner within said furnace having downwardly extending fuel and air ports, means for delivering gaseous fuel and air to said ports, means to rotate said furnace, a blast pipe extending longitudinally in the wall of said furnace, means for supplying a blast of air to said pipe, there being a plurality of twyers communicating with said pipe, and means to open and close communication between the blast pipe and the twyer openings; substantially as described.

11. A rotary furnace arranged to receive the material to be treated, a relatively stationary burner within said furnace having downwardly extending fuel and air ports, means for delivering gaseous fuel and air to said ports, means to rotate said furnace, a blast pipe extending longitudinally in the wall of said furnace, means for supplying a blast of air to said pipe, there being a plurality of twyers communicating with said pipe, and automatic means controlled by the rotation of the furnace for opening and closing communication between the twyer openings and said blast pipe; substantially as described.

12. A rotary furnace arranged to receive the material to be treated, a relatively stationary burner within said furnace having downwardly extending fuel and air ports, means for delivering gaseous fuel and air to said ports, means to rotate said furnace, a blast pipe extending longitudinally in the wall of said furnace, means for supplying a blast of air to said pipe, there being a plurality of twyers communicating with said pipe, and automatic means controlled by the rotation of the furnace for opening and closing communication between the twyer openings and said blast, together with means for cooling the walls of the furnace; substantially as described.

13. A rotary furnace arranged to receive the material to be treated, a relatively stationary burner within said furnace having downwardly extending fuel and air ports, means for delivering gaseous fuel and air to said ports, means to rotate said furnace, a blast pipe extending longitudinally in the wall of said furnace, means for supplying a blast of air to said pipe, there being a plurality of twyers communicating with said pipe, automatic means controlled by the rotation of the furnace for opening and closing communication between the twyer openings and said blast pipe, and means for cooling the walls of the furnace and the burner; substantially as described.

14. A rotatable metallurgical furnace arranged to receive the material to be treated, a burner within said furnace, means to rotate said furnace relative to the burner, means to cool said burner, means for cooling the walls of the furnace, a blast pipe extending longitudinally in the wall of the furnace, there being twyer openings communicating with the blast pipe and the interior of the furnace, means for opening communication between the blast pipe and the twyer openings, and means for rotating the burner relative to the furnace; substantially as described.

15. A metallurgical furnace of the rotary type, arranged to receive the material to be treated, a burner within said furnace, a closure for one end of said furnace having an offtake flue connected therewith, means for supporting said closure independent of the furnace, a burner within said furnace having downwardly extending gas and air ports, means for supplying air and gaseous fuel to the ports, a blast pipe extending in a longitudinal direction in the wall of said furnace, twyer openings communicating with the blast pipe and the interior of the furnace, means for supplying air to said pipe, means for opening and closing communication between said blast pipe and the twyer openings, and means to rotate said burner relative to the furnace; substantially as described.

16. A rotary furnace adapted to receive material to be treated, a burner within said furnace having a hollow stem extending through one end of the furnace, means for supplying gaseous fuel to said burner through the hollow stem, an ore receiving cavity in the top of the burner, a blast pipe extending longitudinally in the walls of said furnace, means for supplying a blast of air to said pipe, there being twyer openings extending through the wall of the furnace and communicating with the blast pipe, means to rotate said furnace, means for opening communication between the blast pipe and the twyer openings, and means to rotate said burner relative to the furnace; substantially as described.

17. A rotary furnace adapted to receive material to be treated, a burner having a hollow stem extending outwardly through one end of said furnace, said burner being offset so that the burner is normally in the upper portion of the furnace, and means for supplying gasous fuel to said burner through a hollow stem; substantially as described.

18. A rotary furnace having a support at one end thereof, a longitudinally disposed cooling coil in the walls of the furnace, a gas burner within said furnace having a hollow stem extending through one end thereof and the support, and rotatable connections between the support and the cooling coil for continuously supplying a cooling fluid to said coil; substantially as described.

19. A rotary furnace adapted to receive material to be treated, a burner within said furnace for burning gaseous fuel, a plurality of coils of pipe within the walls of said furnace, each of said coils comprising a plurality of longitudinally extending tubes, means for circulating fluids of a different character through each of said coils, means for rotating the furnace, and means for continuously maintaining connections between the coils and the circulating connections at all times; substantially as described.

20. A rotary furnace adapted to receive material to be treated, a burner within said furnace for burning gaseous fuel, a plurality of coils of pipe within the walls of said furnace, each of said coils comprising a plurality of longitudinally extending tubes, means for circulating fluids of a different character through each of said coils, means for rotating the furnace, and means for continuously maintaining connections between the coils and the circulating connections at all times, and means for cooling the burner; substantially as described.

21. A rotary furnace for receiving the material to be treated, said furnace having heads connected to each end thereof, each of said heads having openings through the central portion thereof, a closure for closing the opening at one end thereof, there being an offtake flue connected to said closure, means for supporting said closure independent of the furnace, water jackets in each of said heads, a cooling coil comprising a plurality of longitudinally extending tubes within the wall of the furnace, means for circulating the cooling fluid through the water jackets in the heads and the coil, means to rotate the furnace, and means for maintaining connections between the fluid circulating means, the coil and the water jackets in the heads during the rotation of the furnace; substantially as described.

22. A rotary furnace adapted to receive material to be treated, a bearing for the furnace at one end thereof, cooling pipes in the walls of the furnace having connections with said journal, a bearing for said journal, inlet and outlet pipes connected to said bearing, and connections between the fluid inlet pipe connected to the bearing and the pipes connected to the journal, substantially as described.

23. A device of the character described comprising a tilting support, a furnace rotatably mounted on said support, a hollow spindle mounted on said support, a hollow bearing connected to the furnace arranged to rotate about said spindle, a burner within the furnace having a hollow spindle extending through the bearing on the furnace and the hollow spindle, substantially as described.

24. A furnace adapted to receive material to be treated, a burner within said furnace having a hollow stem extending through the end of the furnace, means for supplying gaseous fuel to the burner through the hollow stem, and an ore receiving cavity in the top of the burner, substantially as described.

25. A rotary furnace adapted to receive material to be treated, a burner within said furnace having a hollow stem extending through one end of the furnace, said burner being normally stationary but mounted so as to be rotated within the furnace, means for supplying gaseous fuel to the burner through the hollow stem, there being an ore receiving cavity in the burner, the arrangement being such that ore is heated on the top of the burner while the charge of metal within the furnace is being treated, substantially as described.

In testimony whereof, I have hereunto set my hand.

DANIEL E. GRIFFITHS.

Witnesses:
GEO. B. BLEMING,
JESSE B. HELLER.